US010036385B2

(12) United States Patent
Triebe (10) Patent No.: US 10,036,385 B2
(45) Date of Patent: Jul. 31, 2018

(54) SEALING ARRANGEMENT, A CONVEYING DEVICE HAVING A SEALING ARRANGEMENT AND A METHOD FOR OPERATING THE SEALING ARRANGEMENT (75) Inventor: Rene Triebe, Schwerzenbach (CH)

(73) Assignee: DOVER PUMP SOLUTIONS GROUP (EUROPE) GMBH, Oberglatt (CH)

( * ) Notice: Subject to any disclaimer, the term of this patent is extended or adjusted under 35 U.S.C. 154(b) by 0 days.

(21) Appl. No.: 14/382,443

(22) PCT Filed: Mar. 2, 2012

(86) PCT No.: PCT/EP2012/053590
§ 371 (c)(1),
(2), (4) Date: Dec. 3, 2014

(87) PCT Pub. No.: WO2013/127464
PCT Pub. Date: Sep. 6, 2013

(65) Prior Publication Data
US 2015/0097339 A1 Apr. 9, 2015

(51) Int. Cl.
F01D 11/04 (2006.01)
F04C 2/08 (2006.01)
F01C 19/00 (2006.01)
F04C 15/00 (2006.01)
(Continued)

(52) U.S. Cl.
CPC ............ F04C 2/084 (2013.01); F01C 19/005 (2013.01); F04C 2/08 (2013.01); F04C 2/086 (2013.01);
(Continued)

(58) Field of Classification Search
CPC .......... F16J 15/406; F16J 15/40; F16J 15/162; F16J 15/441; F16J 15/064; F04C 2/084;
(Continued)

(56) References Cited

U.S. PATENT DOCUMENTS 2,628,852 A * 2/1953 Voytech ........................ 277/408
3,521,890 A * 7/1970 Holmes et al. ................ 277/551
(Continued)

FOREIGN PATENT DOCUMENTS

DE 20 2004 018 733 U1 4/2005

OTHER PUBLICATIONS

Hermetically definition by The Free Dictionary.*
International Preliminary Report on Patentability for International Application No. PCT/EP2012/053590, dated Sep. 12, 2014.

Primary Examiner — Nathan Cumar
(74) Attorney, Agent, or Firm — Lucas & Mercanti, LLP (57) ABSTRACT The invention relates to a sealing arrangement (1) for conveying devices, in particular for gear pumps, in which an inner space (5) can be sealed off from an outer space (6), wherein the sealing arrangement comprises at least two parts (2, 3) each having at least one sealing surface (20, 21), wherein the sealing surfaces (20, 21) comprise: a first seal (11) along a first, medial perimeter of the sealing surface (20, 21), a second seal (12) along a second, lateral perimeter of the sealing surface (20, 21), a recess (15) between the first seal (11) and the second seal (12), characterized in that the recess (15) can be connected to a source (30) of a flushing medium such that the recess (15) can be actively flushed with the flushing medium.

17 Claims, 5 Drawing Sheets (51) Int. Cl.
*F16J 15/06* (2006.01)
*F04C 27/02* (2006.01)

(52) U.S. Cl.
CPC ...... *F04C 15/0023* (2013.01); *F04C 15/0034* (2013.01); *F16J 15/064* (2013.01); *F04C 27/02* (2013.01)

(58) Field of Classification Search
CPC ........ F04C 2/08; F04C 2/086; F04C 15/0023; F04C 15/0034; F04C 27/02; F01C 19/005
USPC ....................................................... 277/431
See application file for complete search history.

(56) References Cited

U.S. PATENT DOCUMENTS

| | | | |
|---|---|---|---|
| 4,252,352 A | | 2/1981 | Scannell |
| 5,046,934 A | * | 9/1991 | Berges .................. F04C 13/005 418/200 |
| 6,070,951 A | * | 6/2000 | Nakazawa ............ B60T 8/4031 303/113.2 |
| 2004/0200736 A1 | * | 10/2004 | Van Heerden ......... B65D 77/10 206/1.5 |
| 2005/0123414 A1 | * | 6/2005 | Key ...................... F01C 21/108 417/313 |
| 2006/0029848 A1 | * | 2/2006 | Kaye ........................ G01F 1/36 429/424 |
| 2010/0320755 A1 | * | 12/2010 | Williams .............. F16L 19/061 285/355 |
| 2013/0106062 A1 | * | 5/2013 | Hori ........................ F16J 15/40 277/431 |

* cited by examiner

SEALING ARRANGEMENT, A CONVEYING DEVICE HAVING A SEALING ARRANGEMENT AND A METHOD FOR OPERATING THE SEALING ARRANGEMENT

CROSS-REFERENCE TO RELATED APPLICATIONS

This application is a 371 of PCT/EP2012/053590 filed Mar. 2, 2012, which is incorporated by reference herein.

BACKGROUND OF THE INVENTION

The present invention relates to a sealing arrangement, to a conveying device, in particular a gear wheel pump, having a sealing arrangement and also to a method for operating the sealing arrangement.

Many polymers as a molten mass are highly reactive upon contact with oxygen. Even extremely small quantities of oxygen can cause reactions which have undesirable effects on the polymer properties. Moreover, it is possible that both the quality of the polymer produced is significantly impaired and also penetrating oxygen can have the effect that the entire reaction chemistry in the reactor vessel is tipped. As a consequence of this, the polymerization process has to be stopped until the vessel and possible supply lines and also conveying devices are cleaned completely.

During the production of polymers in polymerization reactors, in particular, the exclusion of oxygen from the polymerization process and the plant components required therefor is therefore of utmost importance.

It is often the case that gear wheel pumps are used as conveying devices beneath polymerization reactors. The task of these gear wheel pumps is to discharge the finished reaction product from the reactor and to convey it into further plant components.

To avoid contact between oxygen and the conveying medium, it has already been proposed to provide a sheathing or enclosure of the critical (in any case non-tight) process components (e.g. the gear wheel pump) with an additional protective housing. To this end, the relevant plant components are surrounded with a sheet metal casing, for example, the intermediate space between the plant components and the protective housing being flooded with high-purity nitrogen.

If this method is implemented correctly, although the admission of oxygen to possible leakage points of the process components (e.g. gear wheel pump) is avoided, the known method has significant disadvantages:

The sheathing of plant components is very expensive in production.

The sheathed plant component is no longer easily accessible, and therefore can only be observed poorly and maintained only once the sheathing has been disassembled or opened.

When a complete conveying device is sheathed, it is also necessary for the drive to be sheathed, otherwise a significant leakage of nitrogen occurs in the region of the rotating shaft, since the latter can be sealed off poorly.

Leadthroughs for sensors and actuators (e.g. hand wheels and adjustment mechanisms which can be operated from the outside) can only be sealed off very poorly.

The known sheathings do not afford an optimum seal, and therefore large quantities of high-purity nitrogen often escape unnecessarily.

Moreover, there is a risk of suffocation for operating personnel in the area of a non-tight sheathing filled with pure nitrogen, because the oxygen-containing ambient air is displaced by nitrogen.

In order to seal off separating points which are required within plant components (firstly against the escape of polymer from the conveying device at a high internal pressure or else against possible admission of oxygen), the widest variety of sealing variants are used.

By way of example, sealing points between a gear wheel pump housing and a gear wheel pump cover are sealed off by incorporating gas-filled metal O rings in the cover or the housing.

Under normal conditions, these afford a fairly reliable seal against the escape of polymer from the pump at a high internal pressure. However, the sealing action is not optimal for gases under all operating states.

It is also known in the prior art that individual seals are superposed with nitrogen from the outside and the latter then flows outward into the environment via gaps. In this solution, too, large quantities of nitrogen are wasted. Moreover, the system as a whole cannot be controlled.

BRIEF SUMMARY OF THE INVENTION

The present invention is therefore based on the object of specifying an improved sealing arrangement which does not have at least one of the aforementioned disadvantages of the known arrangements.

The present invention relates firstly to a sealing arrangement for conveying devices, in particular for gear wheel pumps, in which an inner space can be sealed off from an outer space. The sealing arrangement comprises at least two parts each with at least one sealing face, wherein the sealing faces comprise:

a first seal along a first, medial perimeter of the sealing face, a second seal along a second, lateral perimeter of the sealing face, a recess between the first seal and the second seal, wherein the recess can be connected to a source with a flushing medium in such a manner that the recess can be actively flushed through with the flushing medium.

In this case, the flushing medium can be gaseous or liquid, for example. If the flushing medium is gaseous, nitrogen is often suitable, for example. If the flushing medium is liquid, a silicone oil is suitable, for example. Furthermore, a flushing medium which is inert with respect to the conveying medium is chosen in particular. No undesired changes to the conveying medium can therefore arise.

One embodiment variant of the sealing arrangement according to the invention consists in the fact that the first seal and/or the second seal comprise an O ring or a spiral seal.

Further embodiment variants of the sealing arrangement according to the invention consist in the fact that the source is configured in such a way that a constant flow of the flushing medium through the recess or a constant pressure of the flushing medium in the recess can be maintained.

Further embodiment variants of the sealing arrangement according to the invention consist in the fact that the recess and the source are configured in such a way that a closed gas circuit can be maintained.

Further embodiment variants of the sealing arrangement according to the invention consist in the fact that the recess runs at least in certain portions parallel to the first seal and/or to the second seal.

Further embodiment variants of the sealing arrangement according to the invention consist in the fact that provision is made of an inlet point for flushing medium and an outlet point for flushing medium, said points being operatively connected to the recess.

Further embodiment variants of the sealing arrangement according to the invention consist in the fact that one part is a housing of the conveying device and the second part is a cover on the housing of the conveying device.

Further embodiment variants of the sealing arrangement according to the invention consist in the fact that a flow sensor for measuring a flow of flushing medium through the recess is provided.

Further embodiment variants of the sealing arrangement according to the invention consist in the fact that the flushing medium is an inert gas, in particular nitrogen, or an inert liquid, in particular a silicone oil.

Further embodiment variants of the sealing arrangement according to the invention consist in the fact that the recess is a groove.

What is furthermore specified is a conveying device according to the invention, in particular a gear wheel pump, for conveying a conveying medium in an inner space which is substantially hermetically sealed off from an outer space, wherein the conveying device has at least one sealing arrangement according to the invention as per the above embodiments.

What is finally specified is a method for operating a sealing arrangement according to the invention, wherein the sealing arrangement comprises a recess which lies between a first and a second seal and is flushed with a flushing medium.

One embodiment of the method consists in the fact that a flow rate of the flushing medium through the recess or a pressure of the flushing medium in the recess is kept constant.

Further embodiments of the method consist in the fact that a flow rate of the flushing medium into the recess is measured.

Further embodiments of the method consist in the fact that a possible medium loss of flushing medium is determined from measurements of the flow rate and in the fact that an audible and/or visual warning notification is activated if a predefined limit value for the medium loss is exceeded.

Reference is made expressly to the fact that the above-mentioned embodiment variants, whether those for the sealing arrangement, for the conveying device or for the method, can be combined in any desired way. Merely those combinations or combinations of combinations which would otherwise lead to inconsistencies are excluded.

BRIEF DESCRIPTION OF THE DRAWINGS

The present invention will be explained in more detail hereinbelow on the basis of drawings, which show possible embodiment variants. In the drawings.

DETAILED DESCRIPTION OF THE PREFERRED EMBODIMENTS

Figure 1:
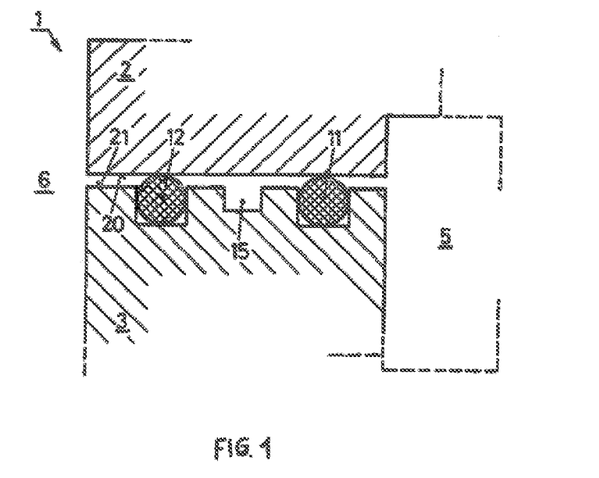
FIG. 1 shows a first embodiment variant of a sealing arrangement according to the invention in a schematic illustration.
Figure 2:
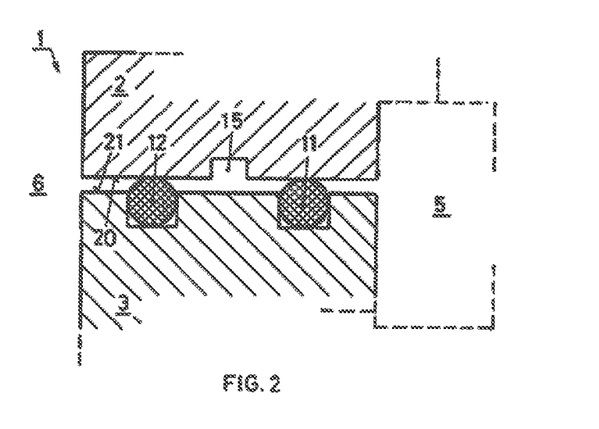
FIG. 2 shows a second embodiment variant of a sealing arrangement according to the invention, again in a schematic illustration.

FIG. 1 schematically shows a first embodiment variant for a sealing arrangement 1 according to the invention in a section transverse to the profile of the seal. The sealing arrangement 1 is suitable for hermetically sealing off two parts 2 and 3 which can be detachably connected to one another. The intention in this respect is to prevent gases in particular from being able to pass from an outer space 6 into an inner space 5, and vice versa. Proceeding from the inner space 5, which in the case of a gear wheel pump, for example, is the pump inner space, the sealing arrangement 1 firstly consists of a first seal 11. Proceeding from the outer space 6, which is the environment for example, the sealing arrangement 1 firstly consists of a second seal 12. A recess 15, for example in the form of a groove, through which a flushing medium, for example nitrogen, flows is provided between the first seal 11 and the second seal 12. The recess 15 can be arranged either in the part 3 (FIG. 1) or in the part 2 (FIG. 2). An embodiment variant in which a recess 15 is provided both in the first and in the second part is also conceivable (not shown in the figures).

The sealing arrangement 1 therefore has a two-stage design, specifically in that the first seal 11 and the second seal 12 are provided. In the center between the two seals 11 and 12, provision is made of a flushing zone, in which the flushing medium is added via an explicitly provided recess 15 and actively flows through the recess 15, carrying along oxygen which is possibly admitted and leading it away in a targeted manner, so that it is not possible for the conveying medium to come into contact with the oxygen in the inner space 5. According to the invention, the flushing medium will therefore flow actively into a flushing zone, consisting of the Intermediate space between the two seals 11 and 12, but particularly of the recess 15 since this makes up the greatest cross-sectional area, and will be actively carried away.

The seals 11 and 12 can be, for example, O rings. However, reference is made expressly to the fact that in principle the invention operates faultlessly with any proven type of seal. In a further embodiment variant, it is conceivable for two different types of seal to be used, i.e. the first sear 11 and the second seal 12 do not have to work on the basis of the same principle.

A spiral seal (obtainable for example under the trade name Spiroflex) is also suitable in particular as the seal. The spiral seal consists of a helically wound sealing material pressed under a prestress. In theory, a spiral seal therefore has a minimal leakage duct along the wound helical furrows. For this reason, the spiral seal is also considered not to be a perfect seal. Especially also in the case of such seals which are not perfect, the sealing arrangement according to the invention nevertheless makes it possible to achieve a good seal, particularly in the case of gaseous flushing media.

The present invention has significant advantages over known sealing arrangements in particular also in the event that individual components of the sealing arrangement 1 fail.

If the first seal 11 fails, hot polymer finds its way as far as the second seal 12 and in the worst case blocks at most the flushing duct, i.e. the recess 15. Furthermore, it is also possible for flushing medium to find its way into the inner space 5 and to thus come into contact with the conveying medium. This is not known to involve any risk, since the flushing medium is chosen in such a way that the conveying medium will not be changed by contact with the flushing medium.

If the second seal 12 fails, in the worst case flushing medium finds its way into the surroundings. This situation can be detected by a method which is still to be described and can be indicated if required.

The active flushing away even averts the possibility of diffusion of oxygen through the second seal 12 into the flushing space, where it can accumulate—if it is not actively transported away—in the flushing medium, here for example nitrogen, and can then find its way into the process.

The sealing arrangement 1 according to the invention has at least one of the following advantages:

Multiple seals, as is proposed as per the sealing arrangement according to the invention with the first seal 11 and the second seal 12, tolerate the failure of a seal more effectively, irrespective of whether the same or different types of seal are used. If, for example, the first (i.e. inner) seal 11 fails—for example owing to sagging of a cover used for a gear wheel pump, owing to combustion of the sealing material, embrittlement, long-term influences (in particular on the conveying medium) the outer seal 12 still affords a seal.

The volume for flushing medium is relatively small and clearly limited locally in the sealing zone; large leakages of flushing medium can thereby be avoided.

A flushing medium flow can be set in a targeted manner and can be released at a site at which there is no threat to people.

The sealing arrangement 1 can be monitored in two respects: firstly, a change, in particular a decrease in the flushing medium flow or a drop in pressure when lines for the flushing medium are closed, can be detected. Secondly, each individual sealing zone (i.e. within the first seal 11—i.e. in the inner space 5), between the first seal 11 and the second seal 12, and outside the second seal 12 (i.e. in the outer space 6) can be individually filled with helium, in order to thereby be able to identify a leaking sealing arrangement.

Sheathing of a plant component is no longer required, and therefore the plant components are better accessible for maintenance work.

Even if the sealing faces 20 and 21 are temporarily lifted (e.g. owing to large mechanical loading), the flushing medium reliably prevents the penetration of oxygen.

The sealing arrangement 1 according to the invention is suitable in particular for use in the case of gear wheel pumps, it being possible for the sealing arrangement 1 to be used on each of the two pump covers. In addition, the sealing arrangement according to the invention is outstandingly suitable in the case of all sealing covers and in the case of all sealing points of sensors or actuators protruding into the gear wheel pump. In general, the sealing arrangement according to the invention is suitable in particular in the case of all static sealing points.

Figure 3:
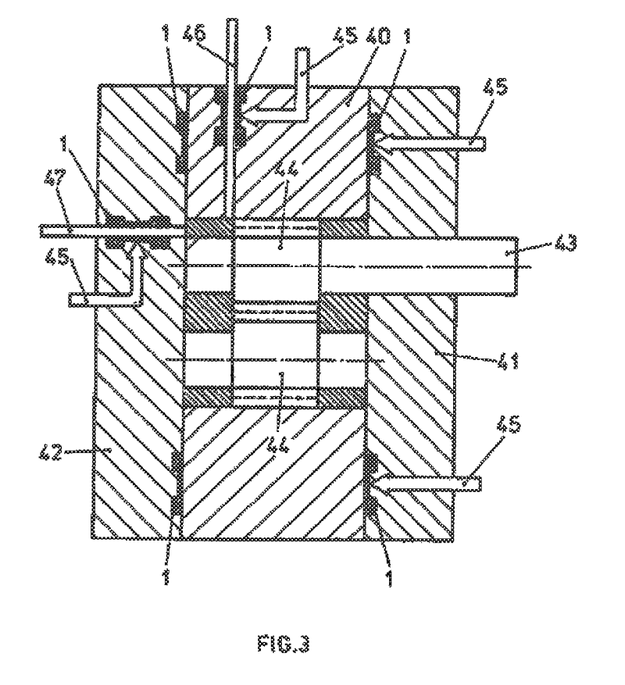
FIG. 3 shows a gear wheel pump, which is sealed off to the outside by the sealing arrangement according to the invention.

FIG. 3 shows a section through a gear wheel pump which consists of a pump housing 40, of a first cover 41, through which a drive shaft 43 is guided outward, and of a second cover 42 on that side of the pump housing 40 which lies opposite the first cover 41. 1 again denotes the sealing arrangements, as have been explained by way of example on the basis of FIGS. 1 and 2, the flushing medium being supplied and discharged via supply and discharge lines 45. The sealing arrangements 1 according to the invention are used for statically sealing off a sensor unit 46, for example a pressure sensor, or an actuator unit 47, for example for controlling a throughflow valve, as are often required in the return duct in the case of gear wheel pumps.

A dynamic seal, as has been described by way of example in EP-0 881 392 B1 in the name of the same applicant, is advantageous for sealing off the drive shaft 43 guided out of the pump housing 40 and the first cover 41.

Figure 4:
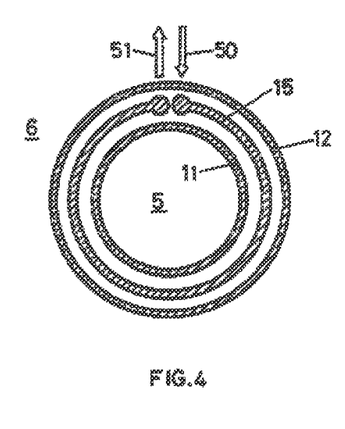
FIG. 4 shows the sealing arrangement according to the invention in a plan view.

FIG. 4 shows the sealing arrangement shown in FIGS. 1 and 2 in a plan view, the inner space 5 and the outer space 6 being denoted by the reference signs without further information. In relation to the inner space 5 and the further components of the sealing arrangement, the first seal 11 is arranged on a medial perimeter and the second seal 12 is arranged on a lateral perimeter. The recess 15 is arranged between the first seal 11 and the second seal 12, but is interrupted in the region of the supply line 50 and of the discharge line 51 so that active flooding of the recess 15 with the flushing medium is possible.

The sealing arrangement shown in FIG. 4 is also referred to for instance as an "omega" arrangement, since flushing medium flows in and flows out via $\Omega$-shaped recesses 15. In this case, the inflow and outflow connections lie close together and the flushing medium has to flow from the inlet along the long path almost around the entire circuit (i.e. at least around the inner space 5) as far as the outlet. This ensures that the flushing medium flows through the complete extent between the e.g. circularly arranged seals 11 and 12.

It can be seen from the sealing arrangements explained to this effect that the seals 11 and 12 are arranged in one plane. In a further embodiment variant of the present invention, provision is made of an arrangement of the seals 11 and 12 outside this plane (for example over a corner of the component to be sealed off).

Figure 5:
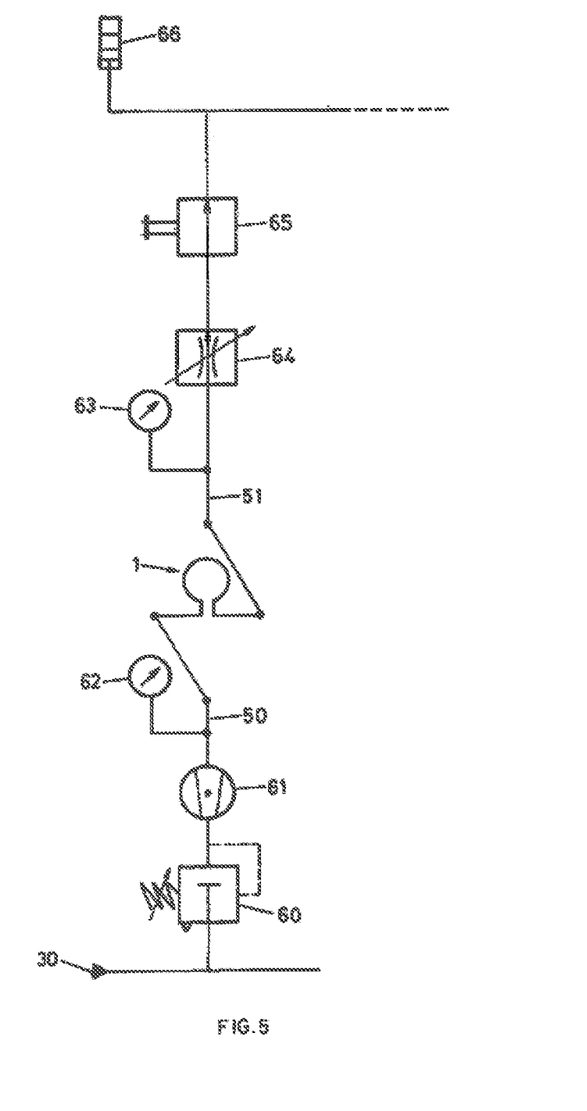
FIG. 5 shows a block diagram for monitoring the flow rate for a flushing medium through a recess.

FIG. 5 shows a schematic illustration of a throughflow system for monitoring the flow of flushing medium through the recess 15 of a sealing arrangement 1. The throughflow system consists firstly of a source 30 (for example a pressure vessel with sufficiently stored flushing medium), which is connected by the supply line system via a pressure control valve 60 and a flow meter 61 to the supply line 50 of a sealing arrangement 1. For the sake of simplicity, the sealing arrangement is schematically represented in FIG. 5 merely by an omega. The discharge line 51 is in turn connected to a line system which is routed via a valve 64 and a stopcock 65 to an outlet 66, where for example controlled outward discharge is effected. A pressure sensor 62, 63 is provided both on the input side, i.e. at the supply line 50, and on the output side, i.e. at the discharge line 51, to monitor the pressure conditions in the sealing arrangement.

The throughflow system proposed according to the invention makes it possible to carry out a targeted search for leaks. To this end, it is necessary that both the volumetric flow rate and the pressure are measured as the flushing medium flows into the flushing duct (recess 15), as well as the outlet pressure as the flushing medium flows out. The flow of flushing medium can be stopped in a targeted manner by way of an additional on/off switch. The evaluation of the pressures and of the flow rate then makes it possible to make a firm statement as to the mode of operation of the sealing arrangement and possible malfunctions.

In a further embodiment of the present invention, it is provided that a throughflow system of this type is realized for each individual sealing arrangement on the gear wheel pump, such that the operation of all individual sealing arrangements can be tested separately.

It is advantageous in this respect in particular that a test can be carried out during full operation of the gear wheel pump without this influencing the polymerization process.

If leaks arise, each sealing arrangement can be investigated individually by filling the individual flushing ducts with helium. In this respect, it is possible on the one hand for helium leaks inward into the reactor to be detected. On the other hand, it is also possible for leaks of the outer seal to be sought and discovered in a targeted manner outside the gear wheel pump using sensing probes. Corresponding opening valves and connections are not shown in FIG. 5.

It is ideal for the pressure of the flushing medium to be greater than the atmospheric pressure, i.e. a lower excess pressure prevails in the groove.

Furthermore, reference is made expressly to the fact that the sealing arrangement according to the invention—in particular for sealing off a sensor or actuator led through from the outside into the inner space 5 of the conveying device—can also be arranged over a corner, which will be explained still further on the basis of FIG. 6. In this case, it is entirely possible for there to be one medial seal and one or more lateral seals.

Figure 6:
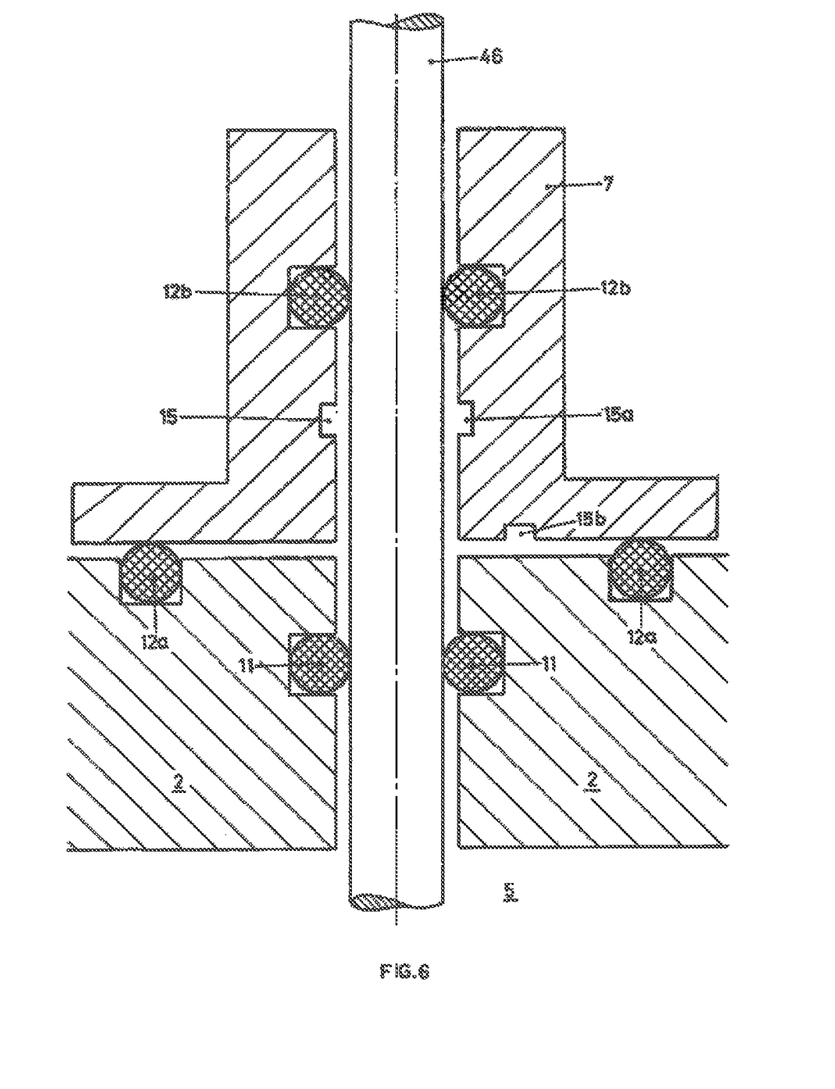
FIG. 6 shows a further embodiment variant for a sealing arrangement according to the invention.

FIG. 6 shows a section through the conveying device at the point at which a sensor 46 is led through into the pump inner space 5. This leadthrough likewise has to be sealed off. The sensor 46 is fixed by a clamping flange 7 screwed onto the pump cover 2 (first part). In this case, the sealing points on the outer diameter of the sensor 46 have to be sealed off by the medial seal 11 and a lateral seal 12b. The further sealing point between the clamping flange 7 and the pump cover 2 is sealed off by the second medial seal 12a. There is either one recess 15 or (as shown in the right-hand part of FIG. 6) two recesses 15a and 15b between the seals.

The invention claimed is:

1. A sealing arrangement in a gear wheel pump for sealing off an inner space of the gear wheel pump from an outer space of the gear wheel pump, the gear wheel pump comprising intermeshing gear wheels disposed in the inner space and configured to convey a conveying material comprising a polymer, the sealing arrangement comprising:
   a first part of the gear wheel pump and a second part of the gear wheel pump, each with at least one sealing face,
   a first seal along a first, medial perimeter of the at least one sealing face between the inner space and the outer space,
   a second seal along a second, lateral perimeter of the at least one sealing face between the inner space and the outer space,
   a recess defined between the first seal and the second seal, the recess being connectable to a source with a flushing medium separate from the conveying medium in the inner space such that the recess can be actively flushed through with the flushing medium carrying along any unwanted oxygen from the recess, the flushing medium being an inert gas or an inert liquid,
   an inlet point for the flushing medium and an outlet point for the flushing medium, said inlet point and outlet point being operatively connected to the recess,
   a flow sensor measuring a flow of flushing medium through the recess,
   an input side pressure sensor and an output side pressure sensor monitoring pressure conditions in the recess between the first seal and the second seal, and
   an on/off switch for selectively stopping the flow of flushing medium through the recess for performing a leakage test.

2. The sealing arrangement as claimed in claim 1, wherein at least one of the first seal and the second seal comprises an O ring or a spiral seal.

3. The sealing arrangement as claimed in claim 1, further comprising the source, wherein the source is configured such that a constant flow of the flushing medium through the recess is maintained.

4. The sealing arrangement as claimed in claim 3, wherein the recess and the source are configured as a closed flushing medium circuit.

5. The sealing arrangement as claimed in claim 1, wherein at least a portion of the recess runs parallel to at least one of the first seal and the second seal.

6. The sealing arrangement as claimed in claim 1, wherein the first part is a housing of the gear wheel pump and the second part is a cover on the housing of the gear wheel pump.

7. The sealing arrangement of claim 1, wherein the flushing medium is nitrogen.

8. The sealing arrangement of claim 1, wherein the flushing medium is silicone oil.

9. The sealing arrangement as claimed in claim 1, wherein the recess is a groove in the at least one sealing face.

10. A conveying device for conveying a conveying medium in an inner space which is substantially hermetically sealed off from an outer space, wherein the conveying device has the sealing arrangement as claimed in claim 1.

11. A method for operating the sealing arrangement as claimed in claim 1, the method comprising introducing a flushing medium into the recess; and flushing the recess with a flushing medium.

12. The method as claimed in claim 11, further comprising the step of maintaining a constant flow rate of the flushing medium through the recess.

13. The method as claimed in claim 11, further comprising the step of measuring a flow rate of the flushing medium through the recess.

14. The method as claimed in claim 13, further comprising the step of determining a possible medium loss of flushing medium from measurements of the flow rate and activating at least one of an audible and visual warning notification if a predefined limit value for the medium loss is exceeded.

15. The sealing arrangement as claimed in claim 1, wherein the recess is disposed in at least one of the first part and the second part, and each of the first seal and the second seal is separated from the recess by a respective portion of the at least one sealing face of the at least one of the first part and the second part.

16. The sealing arrangement as claimed in claim 1, wherein the recess is omega-shaped.

17. The sealing arrangement as claimed in claim 16, wherein each of the first seal and the second seal is a circular seal.

* * * * *